United States Patent
Patel et al.

(10) Patent No.: US 10,588,103 B2
(45) Date of Patent: Mar. 10, 2020

(54) SYNCHRONIZATION FOR STANDALONE LTE BROADCAST

(71) Applicant: QUALCOMM Incorporated, San Diego, CA (US)

(72) Inventors: Shimman Arvind Patel, San Diego, CA (US); Yongbin Wei, La Jolla, CA (US); Peter Gaal, San Diego, CA (US); Alberto Rico Alvarino, San Diego, CA (US); Gordon Walker, Poway, CA (US); Wanshi Chen, San Diego, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/405,759

(22) Filed: May 7, 2019

(65) Prior Publication Data
US 2019/0268864 A1  Aug. 29, 2019

Related U.S. Application Data

(62) Division of application No. 15/479,210, filed on Apr. 4, 2017, now Pat. No. 10,368,329.
(Continued)

(51) Int. Cl.
*H04W 56/00* (2009.01)
*H04W 72/00* (2009.01)
(Continued)

(52) U.S. Cl.
CPC ....... *H04W 56/001* (2013.01); *H04W 72/005* (2013.01); *H04W 72/042* (2013.01);
(Continued)

(58) Field of Classification Search
CPC .. H04B 1/7073; H04B 1/7087; H04B 1/7156; H04B 1/7183; H04B 2201/7073;
(Continued)

(56) References Cited

U.S. PATENT DOCUMENTS

| 8,897,199 B2 | 11/2014 | Li et al. |
| 8,989,021 B2 | 3/2015 | Simon |

(Continued)

FOREIGN PATENT DOCUMENTS

EP   2869491 A1   5/2015

OTHER PUBLICATIONS

DVB Organization: "Multimedia Broadcast Multicast Service (MBMS) in Evolved UTRAN", TM-NGHSM018_MBMSpresentation.ppt, Digital Video Broadcasting, Jan. 28, 2008, XP017809388, 25 pages.
(Continued)

*Primary Examiner* — Sharad Rampuria
(74) *Attorney, Agent, or Firm* — Patterson & Sheridan, L.L.P.

(57) ABSTRACT

Aspects of the present disclosure relate to wireless communications and, more particularly, to synchronization for standalone long term evolution (LTE) broadcast. In one aspect, a method is provided which may be performed by a wireless device such as a base station (BS). The method generally includes providing unicast coverage to one or more user equipments (UEs) in a unicast coverage area within a larger coverage area, transmitting unicast data in one or more subframes, and transmitting synchronization signals within one or more of the broadcast subframes, wherein the broadcast signals are transmitted as single frequency network (SFN) transmissions synchronized with transmissions from one or more other base stations providing unicast coverage within the larger coverage area.

24 Claims, 14 Drawing Sheets

Related U.S. Application Data

(60) Provisional application No. 62/336,353, filed on May 13, 2016, provisional application No. 62/320,953, filed on Apr. 11, 2016.

(51) Int. Cl.
  H04W 72/04 (2009.01)
  H04L 27/26 (2006.01)
(52) U.S. Cl.
  CPC ..... H04W 72/0446 (2013.01); H04L 27/2602 (2013.01); H04L 27/2607 (2013.01); H04L 27/2611 (2013.01)
(58) Field of Classification Search
  CPC .... H04B 7/18589; H04B 7/19; H04B 7/2125; H04H 60/50; H04J 3/06; H04J 3/0602; H04J 3/0605; H04J 3/0614; H04J 3/0617; H04J 3/062; H04J 3/0623; H04J 3/0632; H04J 3/0635; H04J 3/0638; H04J 3/0647; H04J 3/0652; H04J 3/0658; H04J 3/0685; H04J 3/0691; H04J 3/0694; H04J 3/0697; H04J 3/125; H04J 3/1611; H04L 25/247; H04M 2201/22; H04Q 2011/0045; H04W 56/00; H04W 56/0005
  See application file for complete search history.

(56) References Cited

U.S. PATENT DOCUMENTS

| | | |
|---|---|---|
| 9,426,780 B2 | 8/2016 | Futaki et al. |
| 9,596,681 B2* | 3/2017 | Dinan ............... H04W 72/0446 |
| 9,750,044 B2* | 8/2017 | Xu .................... H04W 72/1273 |
| 9,781,714 B2* | 10/2017 | Lorca Hernando .......................... H04W 72/042 |
| 2013/0294317 A1 | 11/2013 | Malladi et al. |
| 2014/0204825 A1 | 7/2014 | Ekpenyong et al. |
| 2014/0233530 A1 | 8/2014 | Damnjanovic et al. |
| 2014/0314047 A1* | 10/2014 | Kalhan ................. H04W 36/38 370/331 |
| 2015/0043491 A1 | 2/2015 | Eng et al. |
| 2015/0055541 A1 | 2/2015 | Zhang et al. |
| 2016/0165578 A1 | 6/2016 | Chen et al. |
| 2017/0295552 A1 | 10/2017 | Patel et al. |

OTHER PUBLICATIONS

International Search Report and Written Opinion—PCT/US2017/026191—ISA/EPO—dated Sep. 5, 2017.
Nokia et al., "Transmission of P-BCH, P-SCH and S-SCH on Dedicated MBMS Carrier", 3GPP TSG-RAN WG1 Meeting #51, R1-074860, Oct. 30, 2007, XP050108316, 5 pages.
Partial International Search Report—PCT/US2017/026191—ISA/EPO—dated Jul. 10, 2017.

\* cited by examiner

SYNCHRONIZATION FOR STANDALONE LTE BROADCAST

CLAIM OF PRIORITY UNDER 35 U.S.C. § 119

This application is a divisional of U.S. patent application Ser. No. 15/479,210, filed Apr. 4, 2017, which claims benefit of U.S. Provisional Patent Application Ser. Nos. 62/320,953 and 62/336,353, filed Apr. 11, 2016 and May 13, 2016, respectively, which are herein incorporated by reference in their entirety.

FIELD OF THE DISCLOSURE

Certain aspects of the present disclosure generally relate to wireless communications and, more particularly, to synchronization for standalone long term evolution (LTE) broadcast.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure provide a method of wireless communications, performed by a wireless node such as a base station (BS). The method generally includes providing unicast coverage to one or more user equipments (UEs) in a unicast coverage area within a larger coverage area, transmitting unicast data in one or more subframes, and transmitting synchronization signals within one or more broadcast subframes, wherein the synchronization signals are transmitted as single frequency network (SFN) transmissions synchronized with transmissions from one or more other base stations providing unicast coverage within the larger coverage area.

Certain aspects of the present disclosure provide an apparatus for wireless communications. The apparatus generally includes at least one processor configured to provide unicast coverage to one or more user equipments (UEs) in a unicast coverage area within a larger coverage area, transmit unicast data in one or more subframes, and transmit synchronization signals within one or more broadcast subframes, wherein the synchronization signals are transmitted as single frequency network (SFN) transmissions synchronized with transmissions from one or more other base stations providing unicast coverage within the larger coverage area. The apparatus also generally includes a memory coupled with the at least one processor.

Certain aspects of the present disclosure provide an apparatus for wireless communications. The apparatus generally includes means for providing unicast coverage to one or more user equipments (UEs) in a unicast coverage area within a larger coverage area, means for transmitting unicast data in one or more subframes, and means for transmitting synchronization signals within one or more broadcast subframes, wherein the synchronization signals are transmitted as single frequency network (SFN) transmissions synchronized with transmissions from one or more other base stations providing unicast coverage within the larger coverage area.

Certain aspects of the present disclosure provide a non-transitory computer-readable medium for wireless communications. The non-transitory computer-readable medium generally includes instructions that, when executed by at least one processor, configure the at least one processor to provide unicast coverage to one or more user equipments (UEs) in a unicast coverage area within a larger coverage area, transmit unicast data in one or more subframes, and transmit synchronization signals within one or more broadcast subframes, wherein the synchronization signals are transmitted as single frequency network (SFN) transmissions synchronized with transmissions from one or more other base stations providing unicast coverage within the larger coverage area.

Certain aspects of the present disclosure provide a method for wireless communications, performed by a wireless node such as a base station (BS). The method generally includes transmitting, within anchor subframes occurring at a first periodicity, synchronization signals of a first type, providing an indication of one or more unicast subframes scheduled to occur between anchor subframes, providing an indication of one or more broadcast subframes scheduled to occur between anchor subframes, and transmitting a plurality of different system information blocks (SIBs) in at least one of a first anchor subframe of the anchor subframes or a first unicast subframe of the one or more unicast subframes.

Certain aspects of the present disclosure provide an apparatus for wireless communications. The apparatus generally includes at least one processor configured to transmit, within anchor subframes occurring at a first periodicity, synchronization signals of a first type, provide an indication of one or more unicast subframes scheduled to occur between anchor subframes, provide an indication of one or more broadcast subframes scheduled to occur between anchor subframes, and transmit a plurality of different system information blocks (SIBs) in at least one of a first anchor subframe of the anchor subframes or a first unicast subframe of the one or more unicast subframes. The apparatus also generally includes a memory coupled with the at least one processor.

Certain aspects of the present disclosure provide an apparatus for wireless communications. The apparatus generally includes means for transmitting, within anchor subframes occurring at a first periodicity, synchronization signals of a first type, means for providing an indication of one or more unicast subframes scheduled to occur between anchor subframes, means for providing an indication of one or more broadcast subframes scheduled to occur between anchor subframes, and means for transmitting a plurality of different system information blocks (SIBs) in at least one of a first anchor subframe of the anchor subframes or a first unicast subframe of the one or more unicast subframes.

Certain aspects of the present disclosure provide a non-transitory computer-readable medium for wireless communications. The non-transitory computer-readable medium generally includes instructions that, when executed by at least one processor, configure the at least one processor to transmit, within anchor subframes occurring at a first periodicity, synchronization signals of a first type, provide an indication of one or more unicast subframes scheduled to occur between anchor subframes, provide an indication of one or more broadcast subframes scheduled to occur between anchor subframes, and transmit a plurality of different system information blocks (SIBs) in at least one of a first anchor subframe of the anchor subframes or a first unicast subframe of the one or more unicast subframes.

Certain aspects of the present disclosure provide a method for wireless communications, performed by a wireless node such as a user equipment (UE). The method generally includes monitoring for synchronization signals within one or more broadcast subframes, wherein the synchronization signals are transmitted as single frequency network (SFN) transmissions synchronized with transmissions from one or more other base stations providing unicast coverage within a larger coverage area, performing acquisition based on the synchronization signals, and monitoring for unicast data in one or more subframes.

Certain aspects of the present disclosure provide an apparatus for wireless communications. The apparatus generally includes at least one processor configured to monitor for synchronization signals within one or more broadcast subframes, wherein the synchronization signals are transmitted as single frequency network (SFN) transmissions synchronized with transmissions from one or more other base stations providing unicast coverage within a larger coverage area, perform acquisition based on the synchronization signals, and monitor for unicast data in one or more subframes. The apparatus also generally includes a memory coupled with the at least one processor.

Certain aspects of the present disclosure provide an apparatus for wireless communications). The apparatus generally includes means for monitoring for synchronization signals within one or more broadcast subframes, wherein the synchronization signals are transmitted as single frequency network (SFN) transmissions synchronized with transmissions from one or more other base stations providing unicast coverage within a larger coverage area, means for performing acquisition based on the synchronization signals, and means for monitoring for unicast data in one or more subframes.

Certain aspects of the present disclosure provide a non-transitory computer-readable medium for wireless communications. The non-transitory computer-readable medium generally includes instruction that, when executed by at least one processor, configure the at least one processor to monitor for synchronization signals within one or more broadcast subframes, wherein the synchronization signals are transmitted as single frequency network (SFN) transmissions synchronized with transmissions from one or more other base stations providing unicast coverage within a larger coverage area, perform acquisition based on the synchronization signals, and monitor for unicast data in one or more subframes.

Certain aspects of the present disclosure provide a method for wireless communications, performed by a wireless node such as a user equipment (UE). The method generally includes, within anchor subframes occurring at a first periodicity, for synchronization signals of a first type, obtaining an indication of one or more unicast subframes scheduled to occur between anchor subframes, obtaining an indication of one or more broadcast subframes scheduled to occur between anchor subframes, and obtaining a plurality of different system information blocks (SIBs) in at least one of a first anchor subframe of the anchor subframes or a first unicast subframe of the one or more unicast subframes.

Certain aspects of the present disclosure provide an apparatus for wireless communications. The apparatus generally includes at least one processor configured to monitor, within anchor subframes occurring at a first periodicity, for synchronization signals of a first type, obtain an indication of one or more unicast subframes scheduled to occur between anchor subframes, obtain an indication of one or more broadcast subframes scheduled to occur between anchor subframes, and obtain a plurality of different system information blocks (SIBs) in at least one of a first anchor subframe of the anchor subframes or a first unicast subframe of the one or more unicast subframes. The apparatus also generally includes a memory coupled with the at least one processor.

Certain aspects of the present disclosure provide an apparatus for wireless communications. The apparatus generally includes means for monitoring, within anchor subframes occurring at a first periodicity, for synchronization signals of a first type, means for obtaining an indication of one or more unicast subframes scheduled to occur between anchor subframes, means for obtaining an indication of one or more broadcast subframes scheduled to occur between anchor subframes, and means for obtaining a plurality of different system information blocks (SIBs) in at least one of a first anchor subframe of the anchor subframes or a first unicast subframe of the one or more unicast subframes.

Certain aspects of the present disclosure provide a non-transitory computer-readable medium for wireless communications. The non-transitory computer-readable medium generally includes instructions that, when executed by at least one processor, configure the at least one processor configured to monitor, within anchor subframes occurring at a first periodicity, for synchronization signals of a first type, obtain an indication of one or more unicast subframes scheduled to occur between anchor subframes, obtain an indication of one or more broadcast subframes scheduled to occur between anchor subframes, and obtain a plurality of different system information blocks (SIBs) in at least one of a first anchor subframe of the anchor subframes or a first unicast subframe of the one or more unicast subframes.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
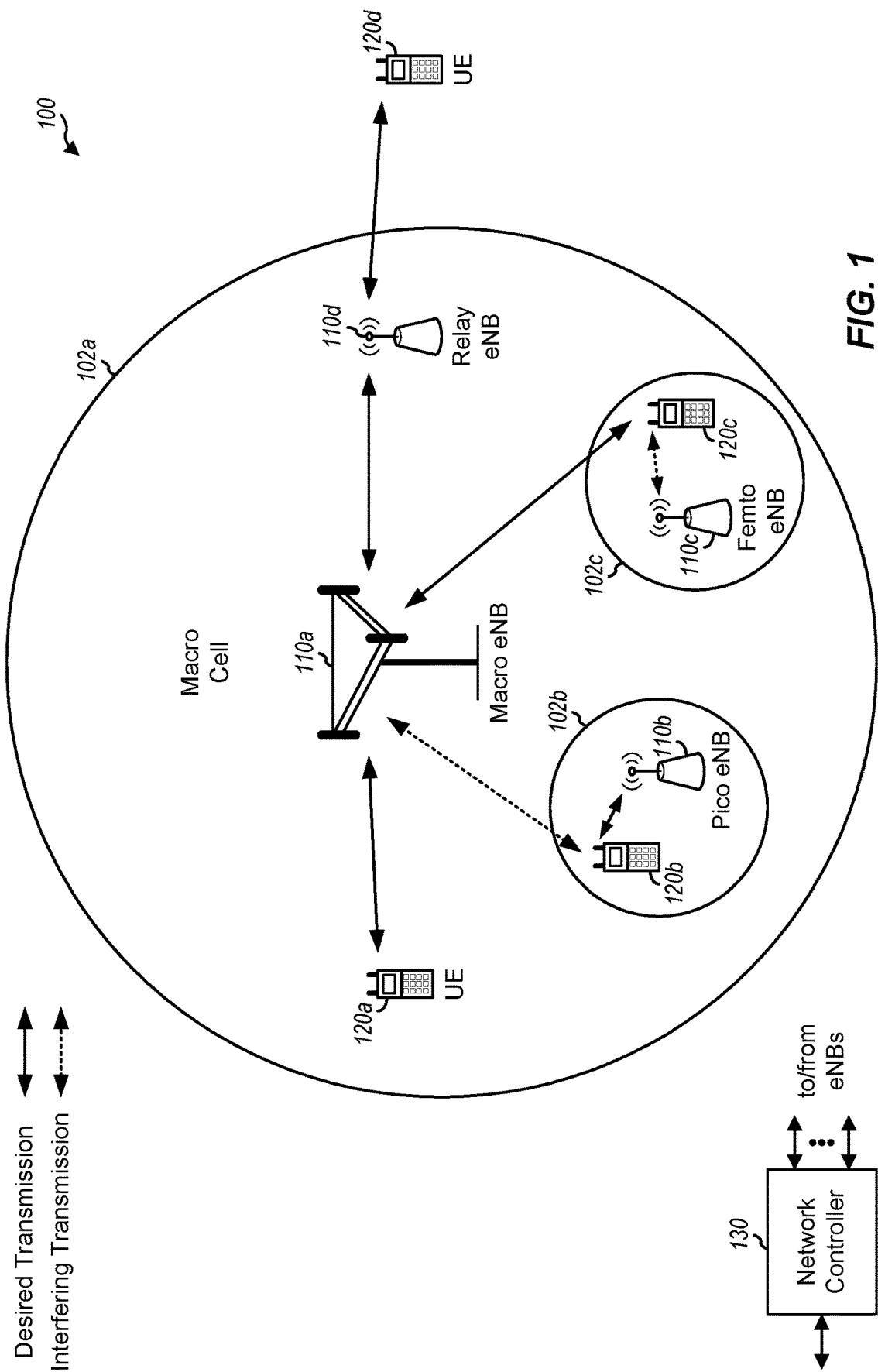
FIG. 1 is a block diagram conceptually illustrating an example of a wireless communication network, in accordance with certain aspects of the present disclosure.

Certain aspects of the present disclosure generally relate to wireless communications and, more particularly, to synchronization for standalone long term evolution (LTE) broadcast.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. Techniques presented herein may be used for synchronization in a standalone long term evolution (LTE) broadcast system.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
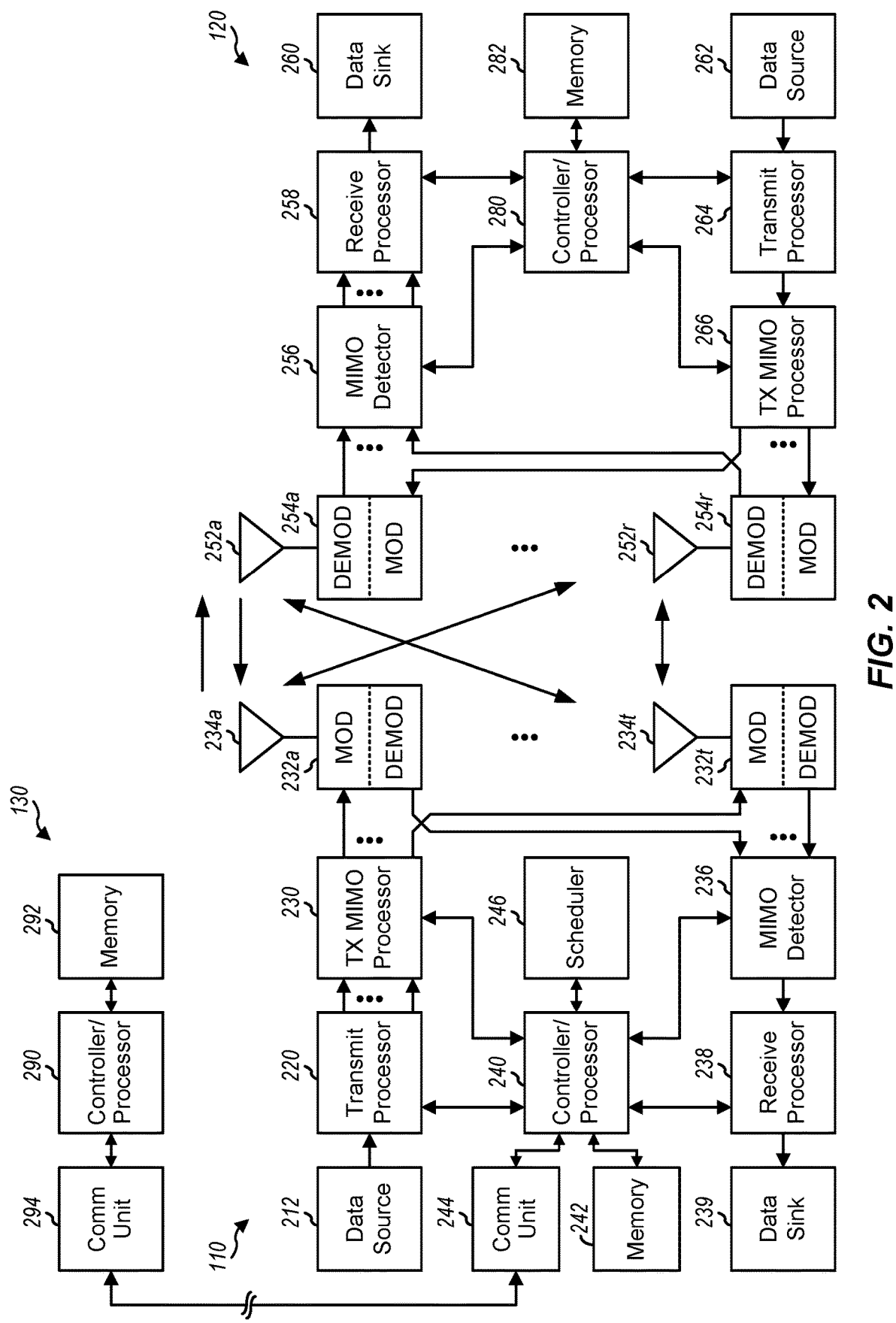
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for defining narrowband regions for enhanced machine type communication (eMTC) to use for communications between a UE (e.g., an eMTC UE) and a base station (e.g., an eNodeB). For example, processor 240 and/or other processors and modules at base station 110, and processor 280 and/or other processors and modules at UE 120, may perform or direct operations of base station 110 and UE 120, respectively. For example, controller/processor 280 and/or other controllers/processors and modules at UE 120, and controller/processor 240 and/or other controllers/processors and modules at BS 110 may perform or direct operations 600, 700, 1000, 1100, 1300, and 1400 shown in FIGS. 6, 7, 10, 11, 13, and 14, respectively. Memories 242 and 282 may store data and program codes for base station 110 and UE 120, respectively. A scheduler 246 may schedule UEs for data transmission on the downlink and/or uplink.

Figure 3:
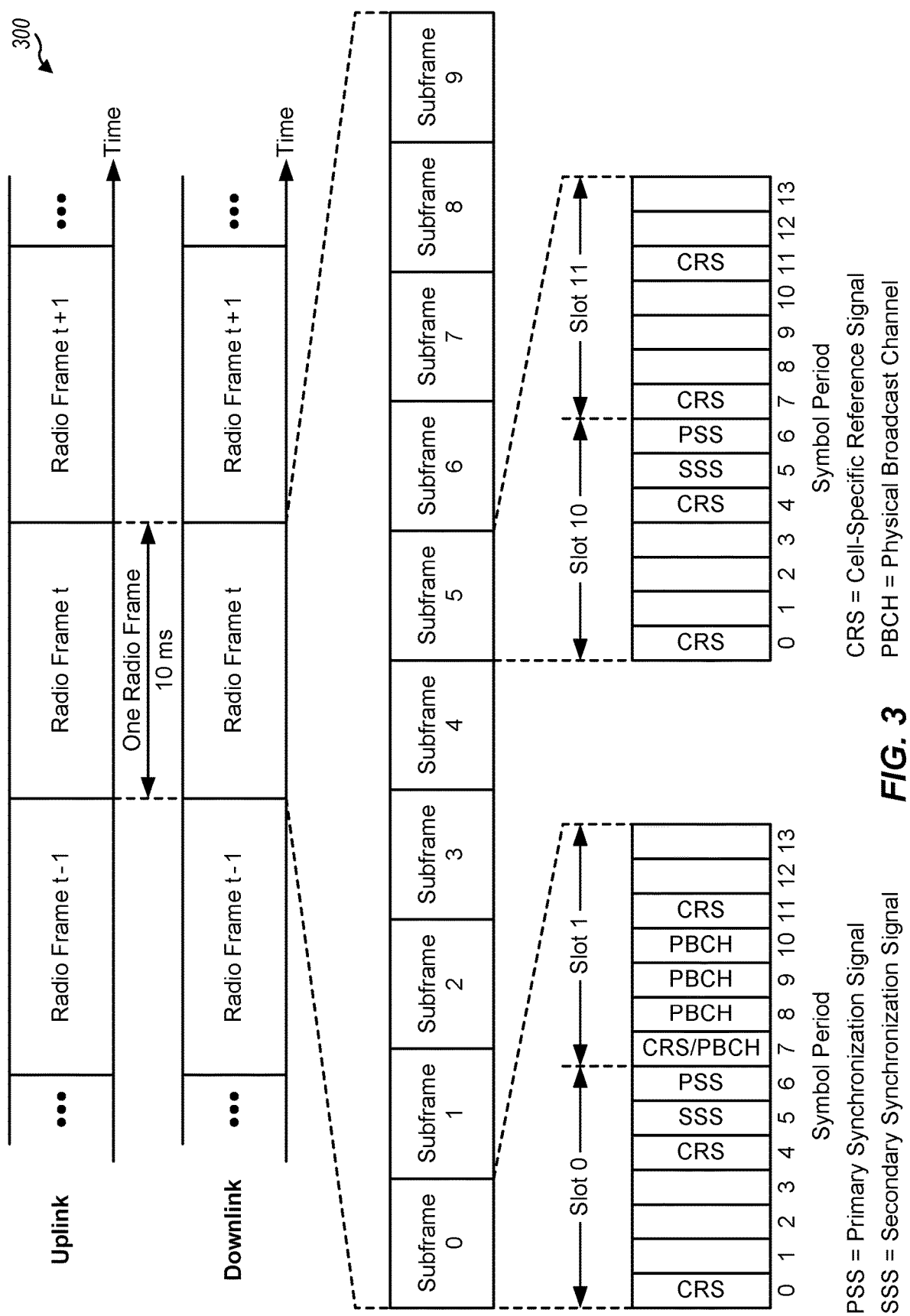
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
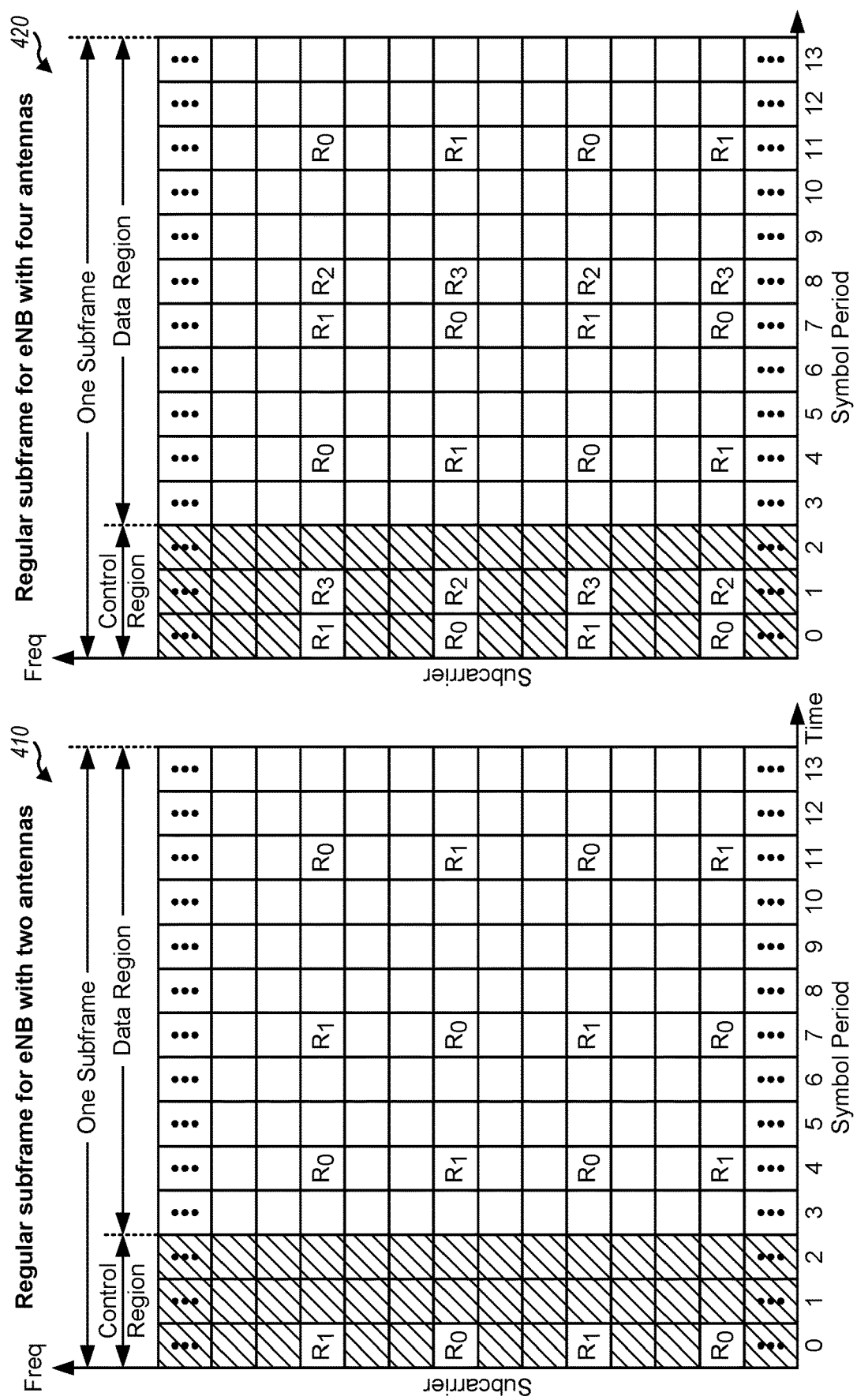
FIG. 4 is a block diagram conceptually illustrating two exemplary subframe formats with the normal cyclic prefix

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

An evolved Multimedia Broadcast and Multicast Service (eMBMS) in a Multimedia Broadcast Single Frequency Network (MBSFN) may be formed by the eNBs in a cell to form a MBSFN area. eNBs may be associated with multiple MBSFN areas, for example, up to a total of eight MBSFN areas. Each eNB in an MBSFN area synchronously transmits the same eMBMS control information and data.

Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Thus a first MBSFN area may support a first eMBMS broadcast service, such as by providing a particular news broadcast to UE and a second MBSFN area may support a second eMBMS broadcast service, such as by providing a different news broadcast to second UE.

Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs. The subframes configured to carry the MBSFN information can vary depending on the diversity mode of the cell. In general, MBSFN can be carried in all subframes except those only available for DL to the UE and special subframes. For example, where the cell is configured for FDD, MBSFN may be configured in all subframes except 0, 4, 5, and 9. For TDD operations, MBSFN may be configured in all subframes except 0, 1, 5, and 6.

Figure 5:
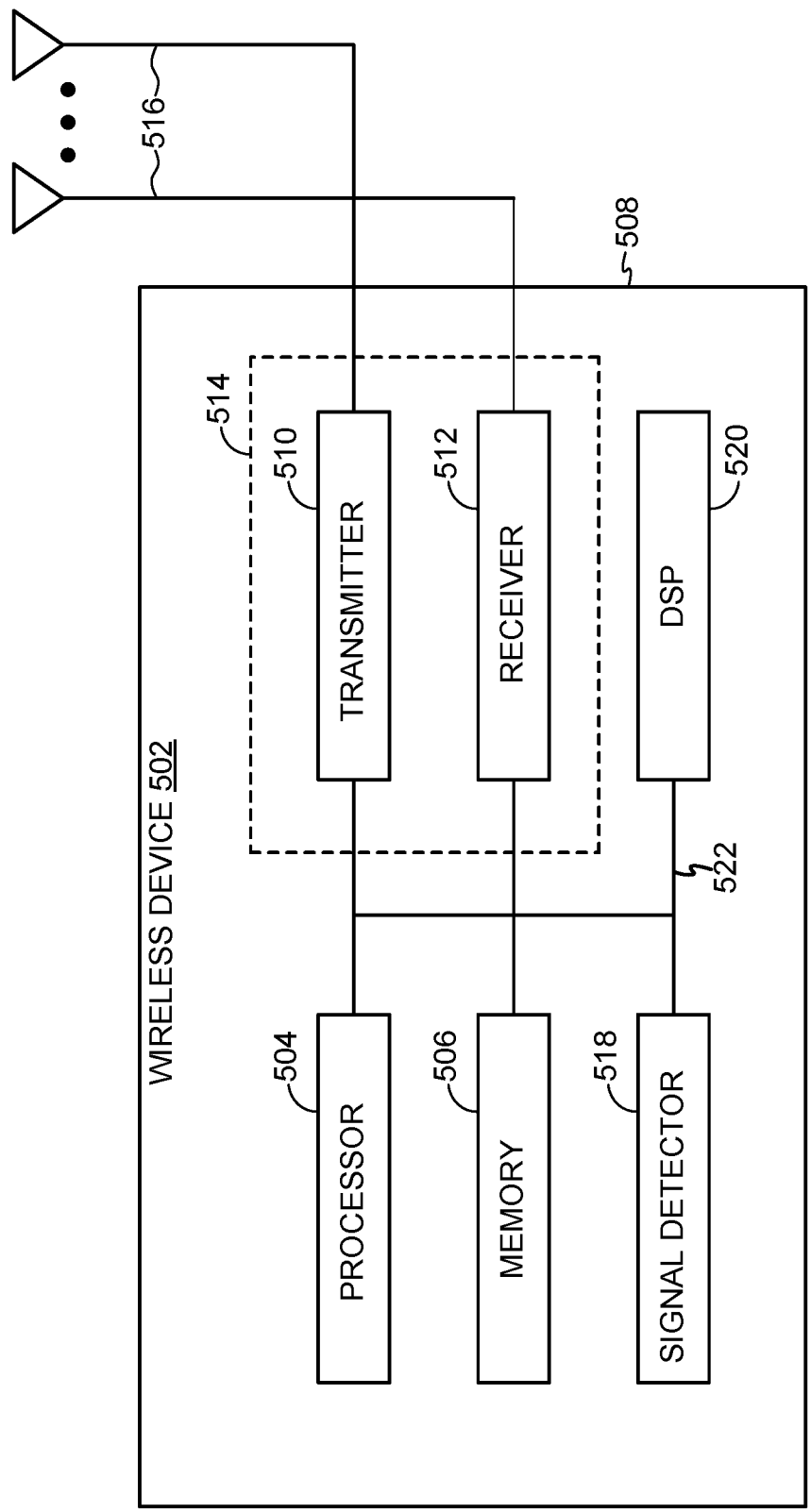
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be a base station 110 or any of the wireless nodes (e.g., 120). For example, the wireless device 502 may be configured to perform operations 600, 700, 1000, 1100, 1300, and 1400 shown in FIGS. 6, 7, 10, 11, 13, and 14, respectively (as well as other operations described herein).

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein, for example, to allow a UE to transmit data efficiently during a connectionless access. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform connectionless access, in accordance with aspects of the present disclosure discussed below.

Example Synchronization for Standalone LTE Broadcast

In LTE, a carrier was introduced for the purpose of transmitting LTE Multimedia Broadcast Multicast Service (MBMS) data. Additionally, a Broadcast-only LTE subframe was previously defined, which comprises no physical downlink control channel (PDCCH) (i.e., the control channel was removed from the Broadcast-only LTE subframe) and little or no unicast traffic (i.e., all or a majority of subframes are configured as Broadcast-only). The LTE MBMS carrier is a standalone carrier, meaning broadcast functionality including synchronization, channel setup, and broadcast data reception must be done within that single MBMS carrier. That is, there is no aid from an anchor primary cell for synchronization or control information for the MBMS carrier.

In the current eMBMS structure, synchronization signals may be present every 5 ms. For example, subframes 0 and 5 are guaranteed to be unicast such that a primary synchronization signal (PSS)/secondary synchronization signal (SSS) can be transmitted. However, conversion of these subframes (i.e., subframes 0 and 5 carrying PSS and SSS) to Broadcast-only subframes eliminates synchronization capabilities based on the PSS and SSS.

Thus, aspects of the present disclosure provide techniques for alieving the issue with synchronization in a standalone LTE Broadcast system due to the lack of synchronization signals for standalone LTE broadcast. For example, one potential method to assist with synchronization in a standalone LTE Broadcast system may be to generate modified PSS and SSS signals (e.g., $PSS_{broadcast}$, $SSS_{broadcast}$ signals). According to certain aspects, the PSS$_{broadcast}$, SSS$_{broadcast}$ signals may be transmitted by a base station within a broadcast subframe in a system number (SFN) configuration (i.e., multiple cells transmit same synchronization sequences). However, there may be a few draw backs associated with modifying the PSS/SSS signals. For example, the PSS$_{broadcast}$ and SSS$_{broadcast}$ signals may increase signaling overhead and may consume resources that should be allocated to Broadcast data. Further, these signals may not be the same as legacy PSS/SSS. For example, the numerology of standalone LTE Broadcast subframe (e.g., symbol and CP duration, tone spacing, pilot placement) may be very different from legacy unicast. With these large differences between broadcast and unicast versions of the synchronization signals, a new set of synchronization reception procedures may be required.

Another method to assist with synchronization in a standalone LTE Broadcast system may involve time division multiplexing (TDM) a low periodicity unicast burst of subframes within a broadcast transmission that allows for the use of legacy LTE PSS/SSS to aid in synchronizing the LTE broadcast channel. As noted, these unicast subframes may be transmitted occasionally with a low periodicity (e.g., 80 ms or 160 ms) and may comprise PSS/SSS and Physical broadcast channel (PBCH) synchronization signals. According to certain aspects, this technique allows the majority of the traffic to remain LTE broadcast transmissions, however, at the expense of a slower channel synchronization time.

Figure 6:
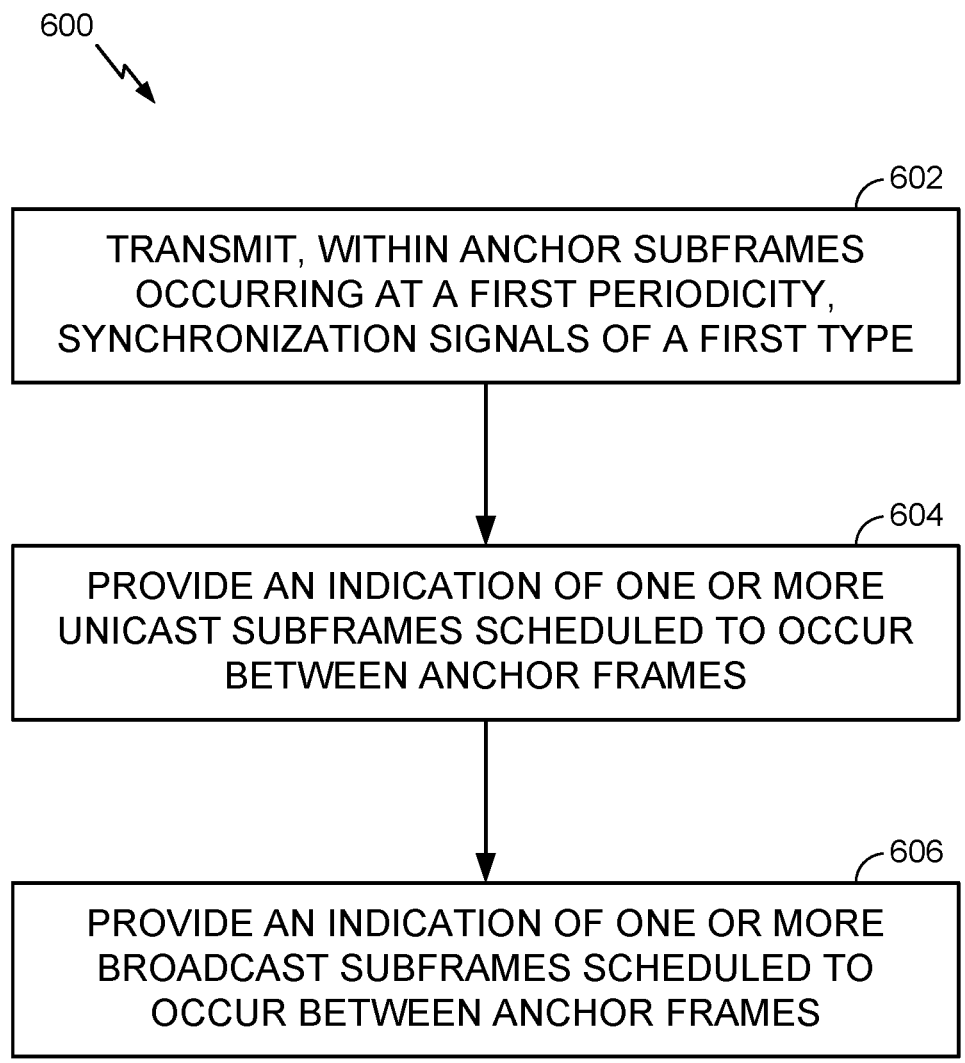
FIG. 6 is a flow diagram illustrating example operations for wireless communications by a base station (BS), in accordance with certain aspects of the present disclosure.

FIG. 6 illustrates example operations 600 for wireless communications, which may be performed, for example, by a base station (e.g., base station 110), in accordance with aspects of the present disclosure. The eNB may include one or more components as illustrated in FIGS. 2 and 5 which may be configured to perform the operations described herein. For example, the antenna 234, demodulator/modulator 232, controller/processor 240, and/or memory 242 as illustrated in FIG. 2 may perform the operations described herein. Additionally or alternatively, one or more of the processor 504, memory 506, transceiver 514, and/or antenna(s) 516 as illustrated in FIG. 5 may be configured to perform the operations described herein.

Operations 600 begin at 602 by transmitting, within anchor subframes occurring at a first periodicity, synchronization signals of a first type. At 604, the base station provides an indication of one or more unicast subframes scheduled to occur between anchor subframes. At 606, the base station provides an indication of one or more broadcast subframes scheduled to occur between anchor subframes.

Figure 7:
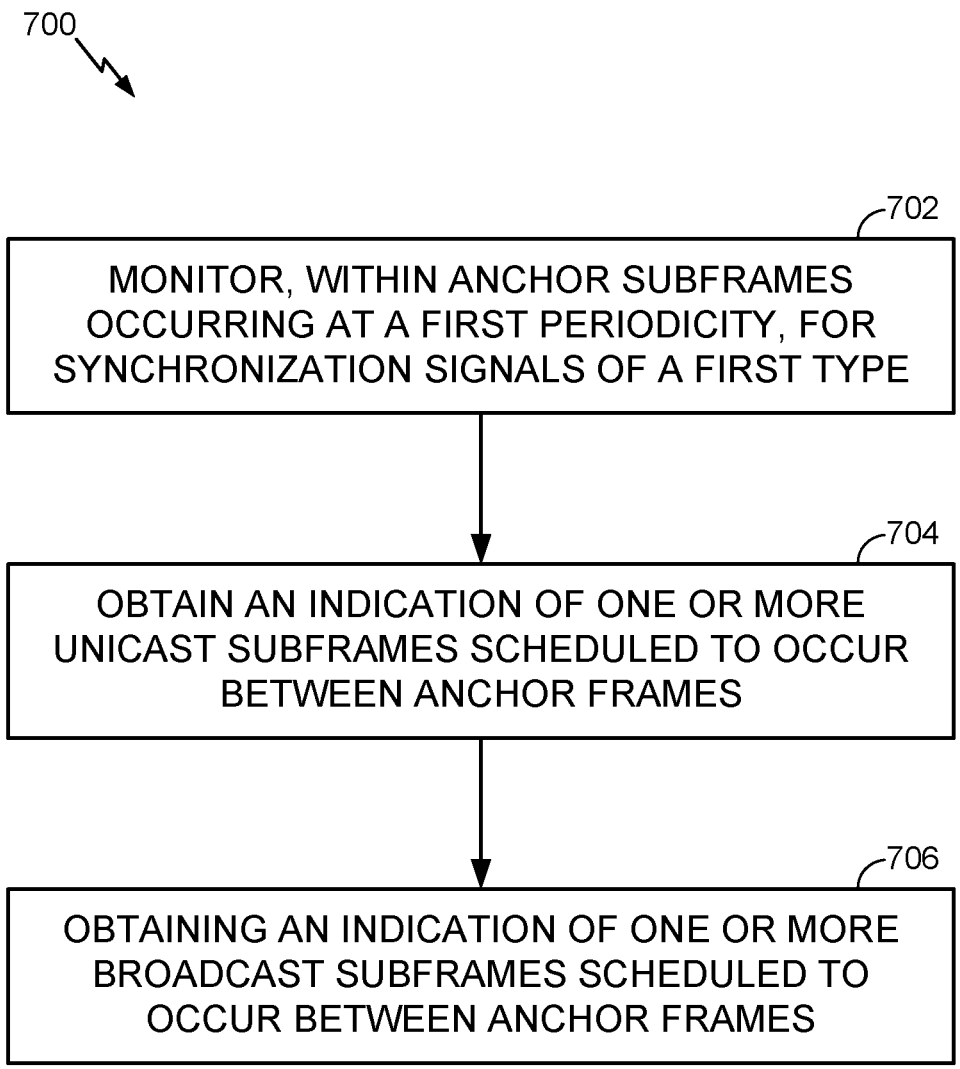
FIG. 7 is a flow diagram illustrating example operations for wireless communications by a user equipment (UE), in accordance with certain aspects of the present disclosure.

FIG. 7 illustrates example operations 700 for wireless communications, which may be performed, for example, by a user equipment (e.g., UE 120), in accordance with aspects of the present disclosure. The UE may include one or more components as illustrated in FIGS. 2 and 5 which may be configured to perform the operations described herein. For example, the antenna 252, demodulator/modulator 254, controller/processor 280, and/or memory 282 as illustrated in FIG. 2 may perform the operations described herein. Additionally or alternatively, one or more of the processor 504, memory 506, transceiver 514, and/or antenna(s) 516 as illustrated in FIG. 5 may be configured to perform the operations described herein.

Operations 700 begin at 702 by monitoring, within anchor subframes occurring at a first periodicity, for synchronization signals of a first type. At 704, the UE obtains an indication of one or more unicast subframes scheduled to occur between anchor subframes. At 706, the UE obtains an indication of one or more broadcast subframes scheduled to occur between anchor subframes. According to certain aspects, the UE may obtain both indications via, for example, one or more antennas 252. While not shown, operations 700 may also include the UE receiving the one or more unicast subframes and one or more broadcast subframes.

As noted above, to help alleviate the issue of synchronization in a standalone LTE Broadcast system, one or more legacy subframes may be transmitted with a low periodicity for the purpose of channel synchronization. According to certain aspects, these legacy subframes may be denoted as anchor subframes and may be transmitted with a specific pre-defined periodicity (e.g., 80 ms or 160 ms). Additionally, the anchor subframe(s) may carry the PSS/SSS signals, which may be transmitted by a base station in known symbols within the subframe(s). For example, the PSS/SSS signals for broadcast synchronization may use the same assignment as legacy PSS/SSS signals. For example, for frequency division duplexing, the PSS may occupy the center 62 tones within the last symbol of the first slot of the anchor subframe and the SSS may occupy the center 62 within the penultimate symbol of the first slot of the anchor subframe. Additionally, for example, for time division duplexing (TDD), the PSS may occupy the center 62 tones within the third symbol of the first slot of the second anchor subframe and the SSS may occupy the center 62 within the last symbol of the second slot of the first anchor subframe. While specific tone/symbol locations are provided, it should be understood that the PSS/SSS tone/symbols may be located anywhere within the anchor subframe.

According to certain aspects, the PBCH may also be transmitted by the base station within the anchor subframe in a pre-known resource allocation. For example, the PBCH may be transmitted in a similar manner as a legacy PBCH (i.e., non-standalone LTE broadcast), for example, in the center 72 tones of the first four symbols within the second slot of the anchor subframe. Likewise, while specific tone/symbol locations are provided, it should be understood that the PBCH tone/symbols may be located anywhere within the anchor subframe.

Additionally, according to certain aspects, using PDCCH grants, a base station may transmit system information block (SIB) information and unicast PDSCH data within the anchor subframe as well as any additional subframes that are allocated as unicast subframes, which are described in greater detail below.

Figure 8:
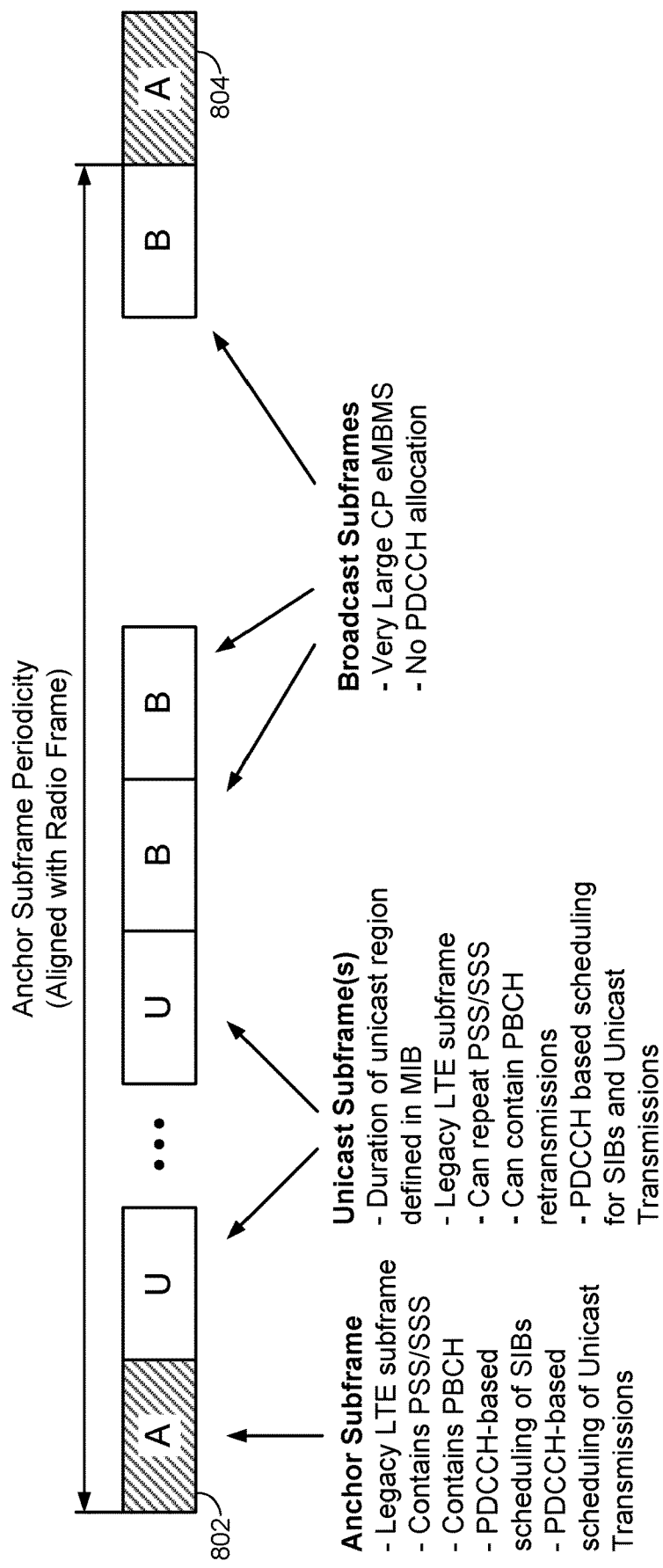
FIG. 8 illustrates an example timeline for LTE standalone broadcast, in accordance with certain aspects of the present disclosure.

FIG. 8 illustrates an example subframe transmission format for LTE standalone broadcast. As illustrated, an anchor subframe (e.g., denoted "A") may be transmitted first and may contain PSS/SSS, PBCH, physical downlink control channel (PDCCH)-based scheduling of SIBs, and PDCCH-based scheduling of unicast transmissions (e.g., indicating a number of unicast subframes that will be transmitted after the anchor subframe). According to certain aspects, the transmission periodicity of the anchor subframe (e.g., 80-160 ms) may be aligned with a radio frame, as illustrated. After the anchor subframe is transmitted by the base station, it may be followed by a number (e.g., as indicated by the scheduling information in the anchor subframe) of unicast subframes (e.g., denoted "U"), which may contain repetitions of the PSS/SSS and/or PBCH and PDCCH-based scheduling for SIBs transmitted in the anchor subframes, as well as unicast transmissions/data. According to certain aspects, the duration of the unicast region may be defined in a master information block transmitted by the base station and monitored for by the UE. Additionally, as illustrated, following the unicast subframes, a number of broadcast subframes (e.g., denoted "B") may be transmitted. The broadcast subframes may not have a PDCCH allocation and may have a large cyclic prefix (CP). According to aspects, the broadcast subframes may contain broadcast data, such as (e)MBMS data.

According to certain aspects, for successful reception of the unicast and broadcast subframes, the MIB transmitted by the base station may need to contain information indicating when unicast and broadcast subframes (e.g., the unicast and broadcast subframes illustrated in FIG. 8) are scheduled. For example, the MIB may comprise an indication of the system bandwidth, the system frame number, and the subframe pattern of the unicast subframe and broadcast subframe transmissions. Additionally, for TDD, the MIB may comprise the DL/UL configuration for the unicast region, for example, as explained in greater detail below. According to certain aspects, upon reception of the MIB, the UE may determine the unicast subframe locations (e.g., for reception of additional SIB information and unicast traffic) as well Broadcast subframe locations and monitor for and receive/obtain these subframes within the determined locations According to certain aspects, repetition of the PSS/SSS synchronization signals as well as the PBCH may be required (e.g., similar to a legacy system), for example, to reach acceptable synchronization and acquisition performance metrics. For example, a known fixed number of repetitions of the PSS/SSS and PBCH may be allowed with known subframe periodicity between the first anchor subframe and its repetitions. For example, with reference to FIG. 8, a fixed number of repetitions of the PSS/SSS and PBCH (e.g., transmitted within unicast subframes) may be allowed between a first transmission 802 of the anchor subframe and a second (repeated) transmission 804 of the anchor subframe.

In some cases, the number of repetitions for each of PSS, SSS, and/or PBCH may vary independently, for example, to meet a performance requirement. According to certain aspects, upon reception of the MIB, the UE may know the exact configuration and allocation of PSS/SSS and PBCH instances/repetitions and modify its receiver algorithm accordingly, for example, to improve reception performance. That is, the UE may modify its receiver algorithm in order to monitor for and receive the PSS/SSS/PBCH repetitions to improve reception performance.

In addition to receiving the MIB, the UE may acquire one or more SIB transmissions, which may be transmitted by the base station in the anchor and unicast subframes, for example, as illustrated in FIG. 8. According to certain aspects, the SIB transmission(s) may be scheduled by the base station via a PDCCH grant (e.g., transmitted in the anchor subframe), and for each SIB (e.g., SIB1-SIB17), a different periodicity may be scheduled, which may be in multiples of the anchor subframe periodicity. For example, SIB1 may be scheduled within each transmission of the anchor subframe, whereas SIB3 may be scheduled every other transmission of the anchor subframe.

Additionally, the anchor subframe(s) and/or unicast subframes may be used by the base station to transmit other types of signals. For example, the base station may use the anchor subframe(s) and/or unicast subframes transmit legacy eMBMS broadcast signals, Single Cell-Point to Multipoint (SC-PTM) signals, and/or a Lean Carrier-New Carrier Type (NC). In some cases, subscription information or authentication/key information may be sent to specific users or groups of users in these unicast subframes (e.g., acting as a side channel).

Aspects presented below provide more detail for a TDD implementation of standalone LTE broadcast synchronization. For example, according to certain aspects, after decoding the anchor subframe, a UE may know DL/UL configuration of unicast subframes based on the indication provided by the base station DL/UL subframe indication, as noted above. For example, the UE may know the configurable number of DL subframes followed by a special subframe, which can include a DL portion, Guard interval, and UL portion, followed by a configurable number of UL subframes. This set of subframes may then followed by the broadcast portion.

Additionally, within the UL portion of the unicast region, the base station may signal, on a per cell basis, that a configurable number of uplink subframes maybe be converted to DL broadcast subframe and may dynamically switch on each anchor subframe period based on broadcast loading. In other words, if a threshold amount of broadcast data needs to be transmitted, the base station may indicate to the UE that certain UL unicast subframes will be converted to broadcast subframes. The UE may reconfigure its reception algorithm accordingly to receive the additional broadcast data. According to certain aspects, this may be similar to LTE TDD enhanced interference mitigation and traffic adaptation (eIMTA), where subframe configurations may be dynamically changed based on a traffic load.

Synchronization Options

It should be noted that, while the techniques described above reduce issues with synchronization in a standalone LTE Broadcast system, these issues may still exist for certain UEs in the wireless network. For example, in some cases, a UE may be in range of the single frequency network (SFN) broadcast portion of a transmission but is unable to receive a unicast portion of the transmission (e.g., the portion carrying the synchronization signals needed by the UE to synchronize to the network).

Figure 9:
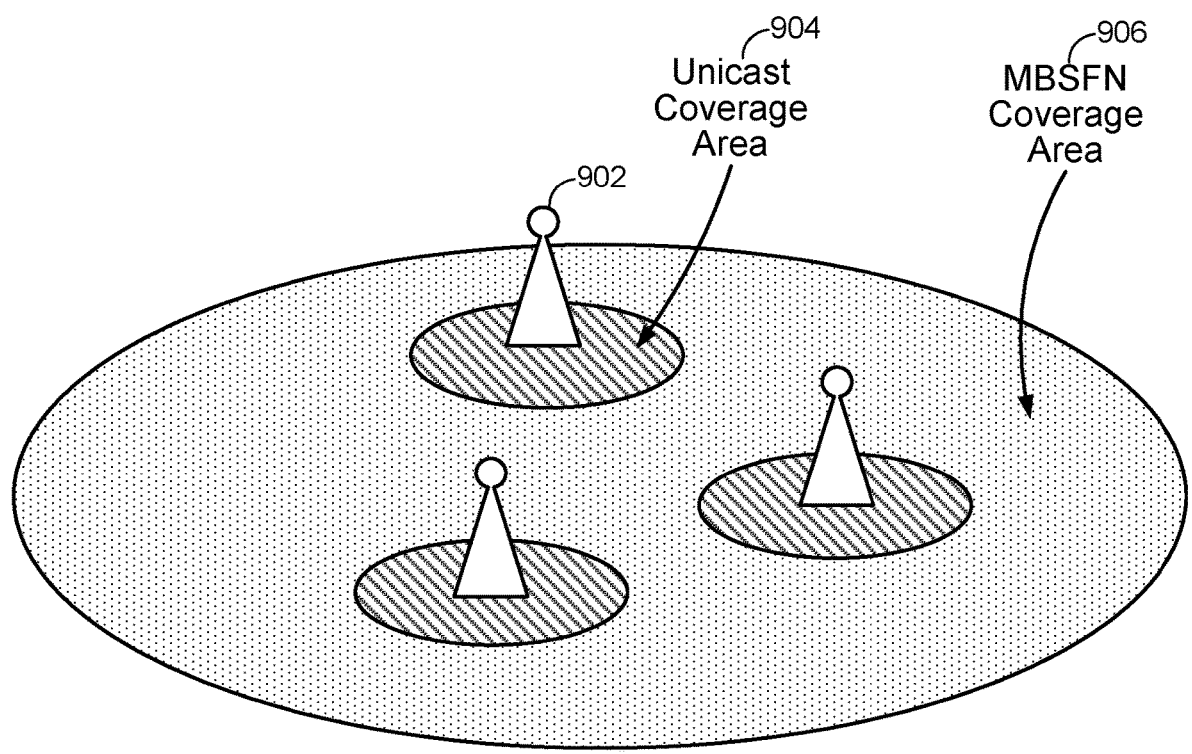
FIG. 9 illustrates an example deployment scenario in which some user equipments (UEs) may not be able to receive unicast synchronization signals, in accordance with certain aspects of the present disclosure.

For example, as illustrated in FIG. 9, under certain deployments where the eNB 902 inter-site distance is large (e.g., rural areas), there may be a coverage gap between the cell-specific unicast transmissions (e.g., unicast coverage area 904) and the SFN transmission of the eMBMS broadcast data (e.g., MBSFN coverage area 906). In other words, a UE that is outside of the unicast coverage area may not be able to acquire the synchronization signals despite being within the coverage area of the SFN eMBMS broadcast subframes. Thus, aspects of the present disclosure propose techniques to address issues related to synchronization in an LTE standalone broadcast network, for example, such as when a UE is within broadcast transmission coverage but is outside unicast transmission coverage.

Figure 10:
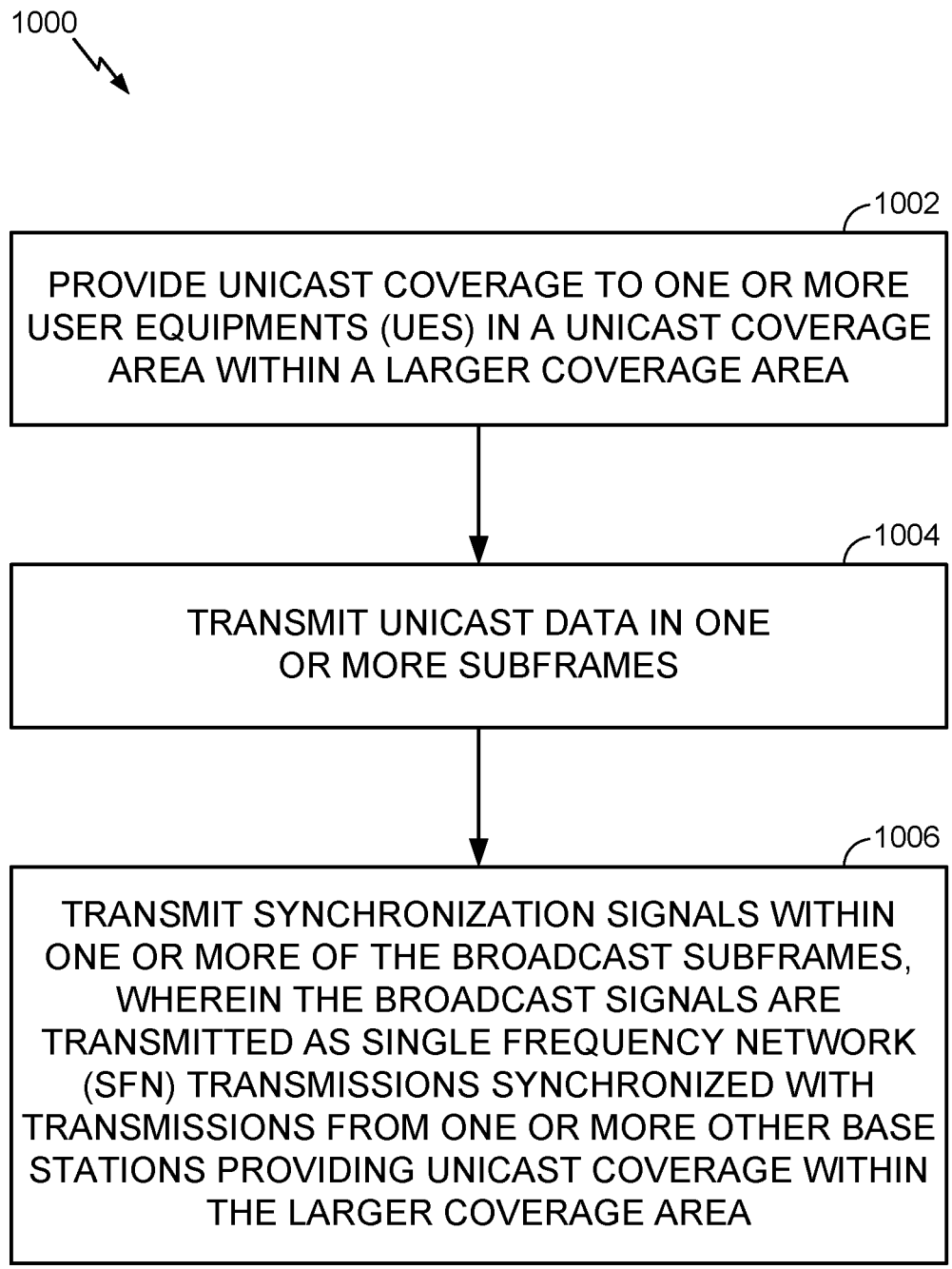
FIG. 10 is a flow diagram illustrating example operations for wireless communications by a base station (BS), in accordance with certain aspects of the present disclosure.

FIG. 10 illustrates example operations 1000 for wireless communications, which may be performed, for example, by a base station (e.g., base station 110), in accordance with aspects of the present disclosure. The eNB may include one or more components as illustrated in FIGS. 2 and 5 which may be configured to perform the operations described herein. For example, the antenna 234, demodulator/modulator 232, controller/processor 240, and/or memory 242 as illustrated in FIG. 2 may perform the operations described herein. Additionally or alternatively, one or more of the processor 504, memory 506, transceiver 514, and/or antenna(s) 516 as illustrated in FIG. 5 may be configured to perform the operations described herein.

Operations 1000 begin at 1002 by providing unicast coverage to one or more user equipments (UEs) in a unicast coverage area within a larger coverage area. At 1004, the base station transmits unicast data in one or more subframes. At 1006, the base station transmits synchronization signals within one or more of the broadcast subframes, wherein the broadcast signals are transmitted as single frequency network (SFN) transmissions synchronized with transmissions from one or more other base stations providing unicast coverage within the larger coverage area.

Figure 11:
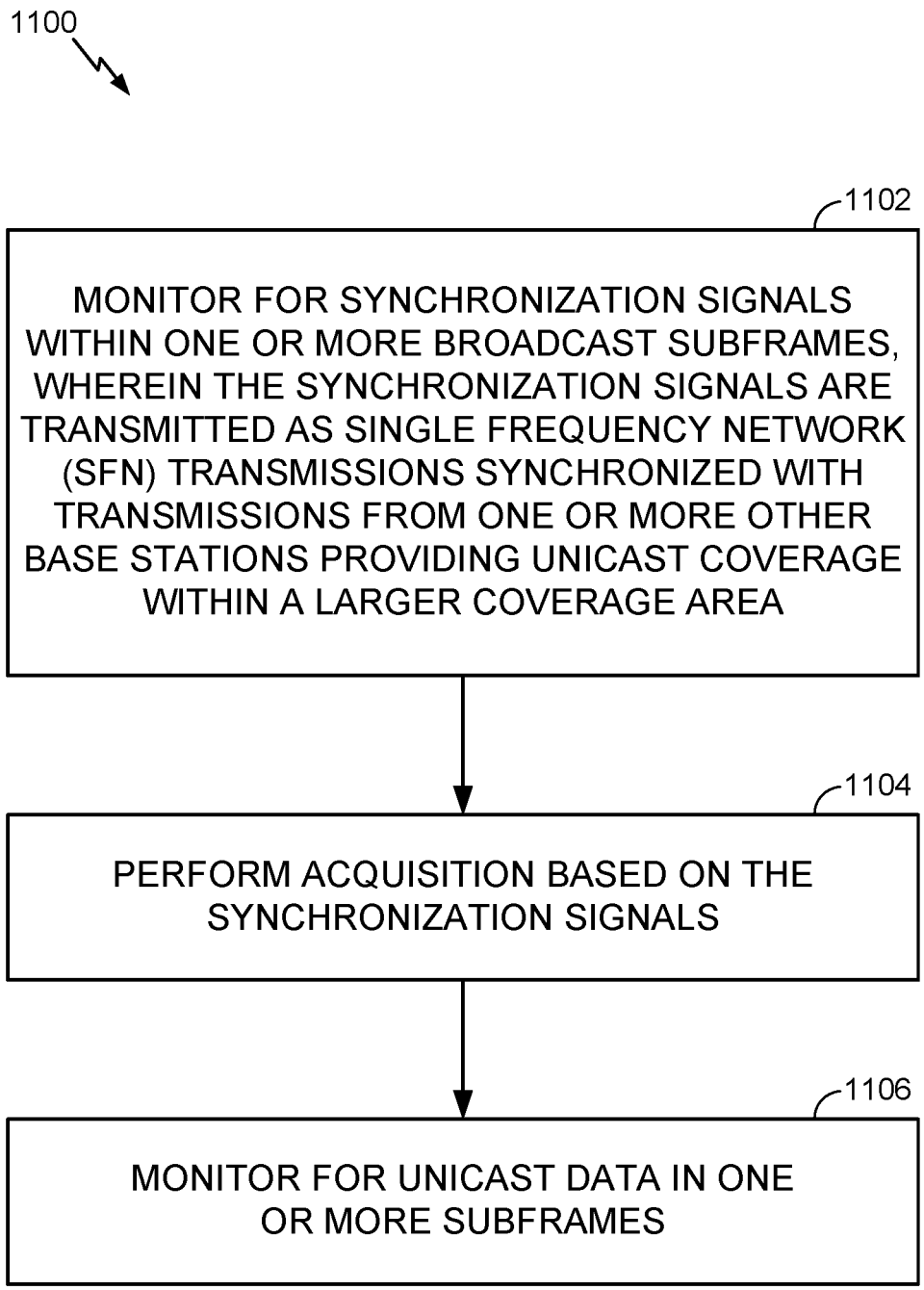
FIG. 11 is a flow diagram illustrating example operations for wireless communications by a user equipment (UE), in accordance with certain aspects of the present disclosure.

FIG. 11 illustrates example operations 1100 for wireless communications, which may be performed, for example, by a user equipment (e.g., UE 120), in accordance with aspects of the present disclosure. The UE may include one or more components as illustrated in FIGS. 2 and 5 which may be configured to perform the operations described herein. For example, the antenna 252, demodulator/modulator 254, controller/processor 280, and/or memory 282 as illustrated in FIG. 2 may perform the operations described herein. Additionally or alternatively, one or more of the processor 504, memory 506, transceiver 514, and/or antenna(s) 516 as illustrated in FIG. 5 may be configured to perform the operations described herein.

Operations 1100 begin at 1102 by monitoring for synchronization signals within one or more broadcast subframes, wherein the synchronization signals are transmitted as single frequency network (SFN) transmissions synchronized with transmissions from one or more other base stations providing unicast coverage within a larger coverage area. At 1104 the UE performs acquisition based on the synchronization signals. At 1106, the UE monitors for unicast data in one or more subframes. According to certain aspects, monitoring for the unicast data in one or more subframes may comprise monitoring for the unicast data in one or more unicast subframes occurring between broadcast subframes.

According to certain aspects, one way to address the issue of certain UE's not being able to receive the unicast data portions of a transmission carrying synchronization signals needed to synchronize with the network may be to transmit all, or portions of, the unicast data in an SFN manner (e.g., where multiple cells simultaneously send the same signal/unicast transmission over a same frequency channel). For example, according to aspects, a base station may transmit all, or a portion, of the unicast data (e.g., including synchronization signals) in one or more broadcast subframes in an SFN manner.

In this case, the unicast portions transmitted in an SFN manner may keep the same legacy LTE numerology (e.g., the same legacy cyclic prefix length). Additionally, all cells (e.g., base stations) in the LTE broadcast system may transmit the same PSS/SSS such that the signal carrying the unicast subframes is SFN. According to certain aspects, other unicast data can be cell-specific or can be the same across an MBSFN coverage area (i.e., SFN). Thus, in certain deployment scenarios, these techniques may improve the UEs ability to acquire the synchronization signal. For example, if signals are sent in an SFN manner, a UE may receive the signals with diversity, which may greatly reduce interference since the UE is no longer receiving interference from far away cells.

Figure 12:
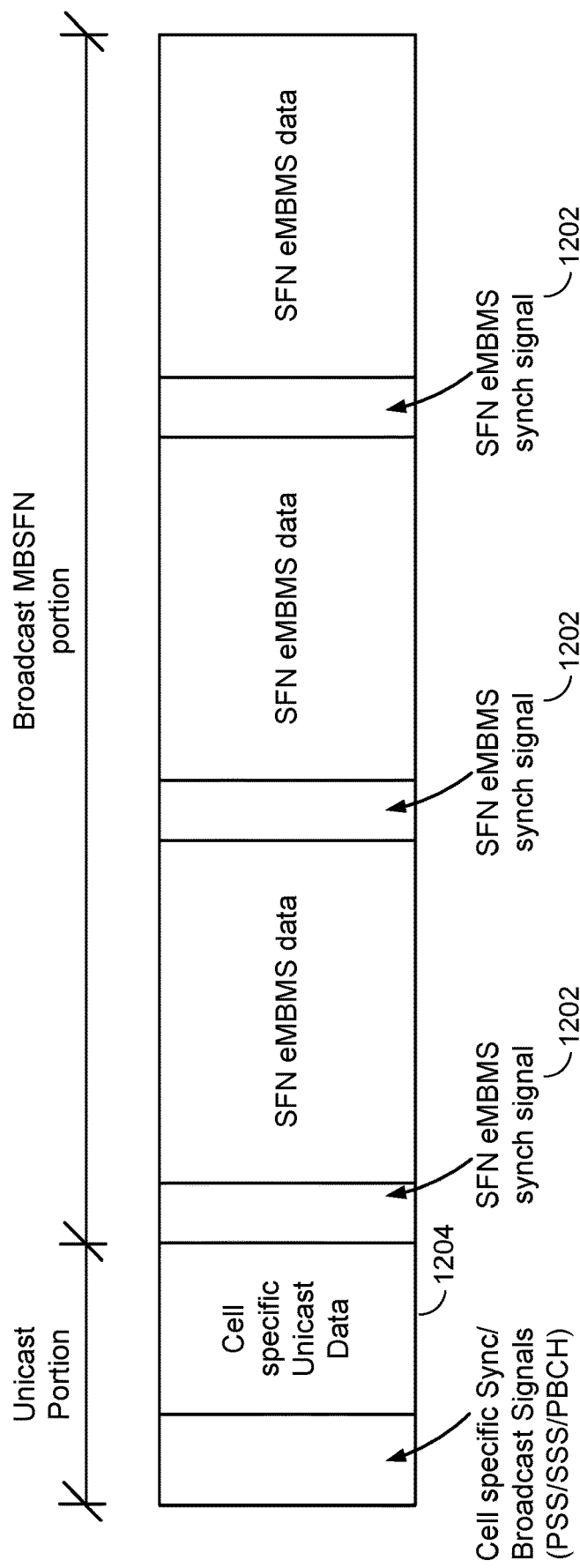
FIG. 12 illustrates the use of a Broadcast MBSFN portion of a transmission frame for transmitting synchronization signals, in accordance with certain aspects of the present disclosure.

According to certain aspects, another way to address the issue of certain UE's not being able to receive the unicast portions of a transmission may be to transmit synchronization signals (e.g., PSS/SSS) and/or MIB/SIB using the broadcast SFN subframes (e.g., in addition to synch signals transmitted in the unicast portions of the transmission). In this case, SFN eMBMS broadcast synchronization signals may be transmitted by a base station periodically within the broadcast SFN subframes. For example, as illustrated in FIG. 12, synchronization signals and/or MIB/SIB may be transmitted periodically in broadcast SFN subframes 1202. According to aspects, these SFN eMBMS synchronization signals may use a new eMBMS LTE numerology (e.g., the longer cyclic prefix length of eMBMS data, for example, as opposed to the cyclic prefix length of unicast data). According to aspects, while FIG. 12 illustrates a plurality of SFN eMBMS synchronization signals being transmitted within the broadcast SFN subframes (e.g., at 1202), any number of SFN eMBMS synchronization signals could be transmitted (e.g., one).

Additionally, in this configuration (i.e., using SFN eMBMS broadcast synchronization signals), the unicast portion 1204 may remain in a TDM structure with the eMBMS SFN data, for example, as illustrated in FIG. 12. For example, the unicast portion 1204 may still be used to transmit unicast, cell-specific data (e.g., data specific to a particular cell). In some cases, the unicast portion may be eliminated by the base station (not illustrated). In this case, when the unicast portion of a transmission is eliminated a UE may be configured to acquire cell coverage using the broadcast synchronization signals (e.g., the SFN eMBMS broadcast synchronization signals). Additionally in this case, no cell-specific information may be transmitted as the unicast portion carrying cell-specific information is eliminated.

According to certain aspects, in some cases, the UE may attempt cell acquisition based on one or both of the unicast synchronization signals and broadcast synchronization signals. For example, in some cases, the UE may try to acquire the unicast synchronization signals. However, if the UE is unable to acquire the unicast synchronization signals, the UE may then try to acquire the broadcast synchronization signals. According to certain aspects, the UE may perform acquisition of the broadcast synchronization signals through blind decoding. Additionally, the UE may try to acquire both the unicast synchronization signals and the broadcast synchronization signals at the same time. Further, in some cases, the UE may use the broadcast synchronization signals to aid (e.g., to supplement) the unicast synchronization signals. For example, timing associated with the broadcast synchronization signals can help determine timing of the unicast synchronization signals, for example, if there is a known alignment between the two.

Additionally, the UE may use the outcome of previous acquisition attempts to determine the acquisition type (e.g., to determine which synchronization signal (broadcast and/or unicast) to try to acquire). For example, a static, remote user that may seldom or never have access to a unicast synchronization signal may be configured to reduce attempts to acquire the unicast synchronization signal and instead primarily try to acquire the broadcast synchronization signals. That is, the UE, knowing it is usually unable to acquire unicast synchronization signals, may forego trying to acquire the unicast synchronization signals (e.g., for a period of time) and instead immediately try to acquire the broadcast synchronization signals.

Transmission of Multiple SIBS in a Subframe

In some cases, a subframe containing discovery and synchronization may need to convey multiple system information blocks (SIBs). For example, if discovery (e.g., reception of SIBs) is performed every 40 ms, it may not be feasible to time division multiplex (TDM) SIBs without incurring in large delays. Thus, it may be necessary for the subframe carrying discovery and synchronization signals to convey multiple SIBs, which may not be supported by current standards.

For example, SIB1 may be scheduled at a predetermined time and other SIBs (e.g., SIB2, SIB3, etc.) are scheduled from SIB1, such that their transmissions do not overlap. According to aspects, each SIB may be addressed by a same system information radio network temporary identifier (SI-RNTI). Additionally, since each SIB transmission does not overlap with any other SIB transmission, HARQ combining can be performed as there may be no confusion about which SIB a UE is receiving (e.g., the UE may perform blind decode from the SI-RNTI to determine which SIB is being received).

However, if multiple SI-RNTI (i.e., multiple SIBs) are transmitted in the same subframe, the UE may become confused as to which SIBS it is receiving. Thus, aspects of the present disclosure provide techniques to enable the transmission of multiple SIBS within a same subframe (e.g., a subframe carrying synchronization signals as described above) such that there is no confusion as to which SIB is being transmitted/received at any given time.

Figure 13:
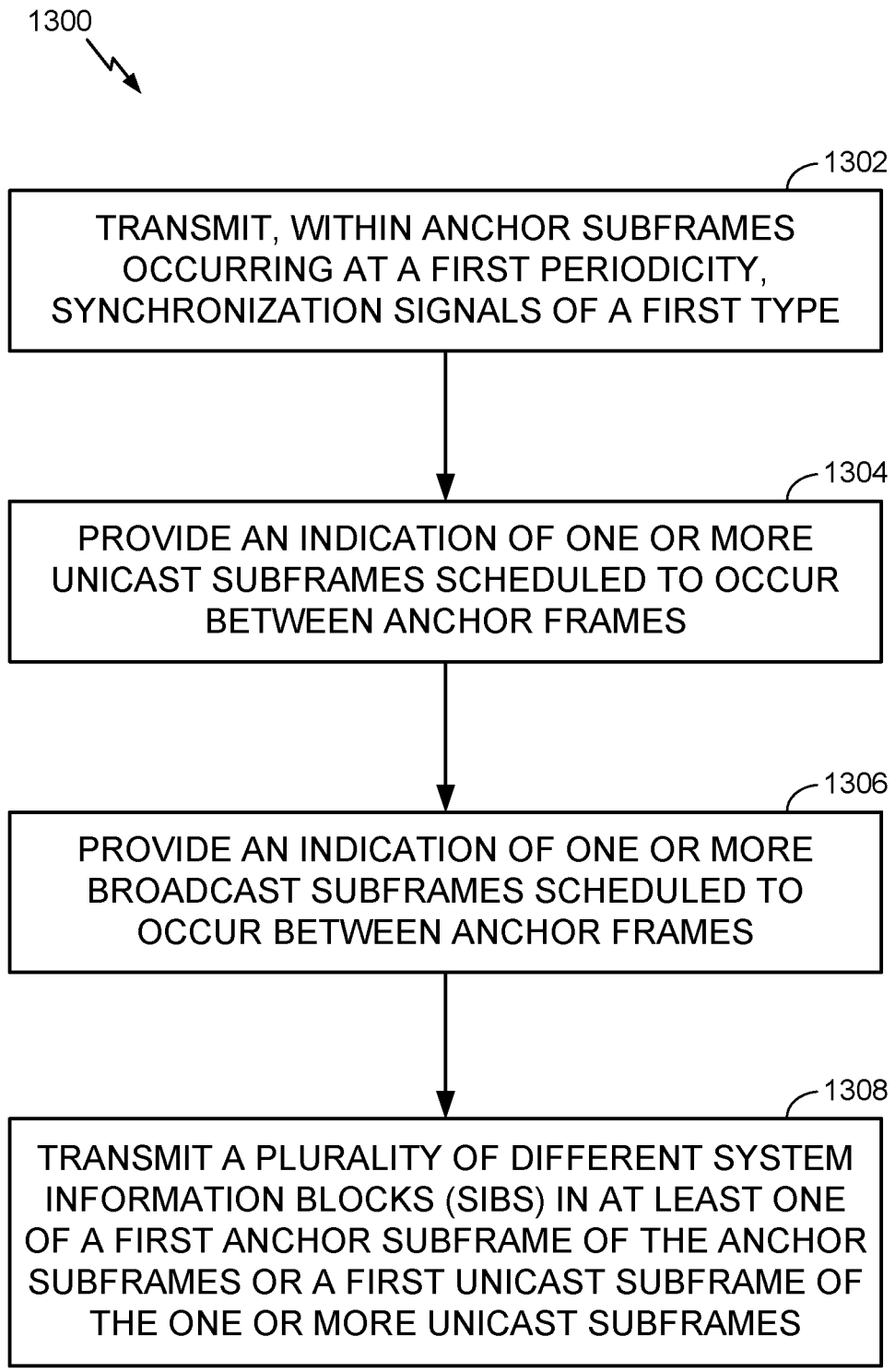
FIG. 13 is a flow diagram illustrating example operations for wireless communications by a base station (BS), in accordance with certain aspects of the present disclosure.

FIG. 13 illustrates example operations 1300 for wireless communications, which may be performed, for example, by a base station (e.g., base station 110), in accordance with aspects of the present disclosure. The eNB may include one or more components as illustrated in FIGS. 2 and 5 which may be configured to perform the operations described herein. For example, the antenna 234, demodulator/modulator 232, controller/processor 240, and/or memory 242 as illustrated in FIG. 2 may perform the operations described herein. Additionally or alternatively, one or more of the processor 504, memory 506, transceiver 514, and/or antenna(s) 516 as illustrated in FIG. 5 may be configured to perform the operations described herein.

Operations 1300 begin at 1302 by transmitting, within anchor subframes occurring at a first periodicity, synchronization signals of a first type. At 1304, the base station provides an indication of one or more unicast subframes scheduled to occur between anchor subframes. At 1306, the base station provides an indication of one or more broadcast subframes scheduled to occur between anchor subframes. At 1308, the base station transmits a plurality of system information blocks (SIBs) in at least one of a first anchor subframe of the anchor subframes or a first unicast subframe of the one or more unicast subframes. While not shown, operations 1300 may also include transmitting synchronization signals within one or more broadcast subframes and transmitting at least one of unicast data or broadcast data in one or more respective unicast subframes or broadcast subframes.

Figure 14:
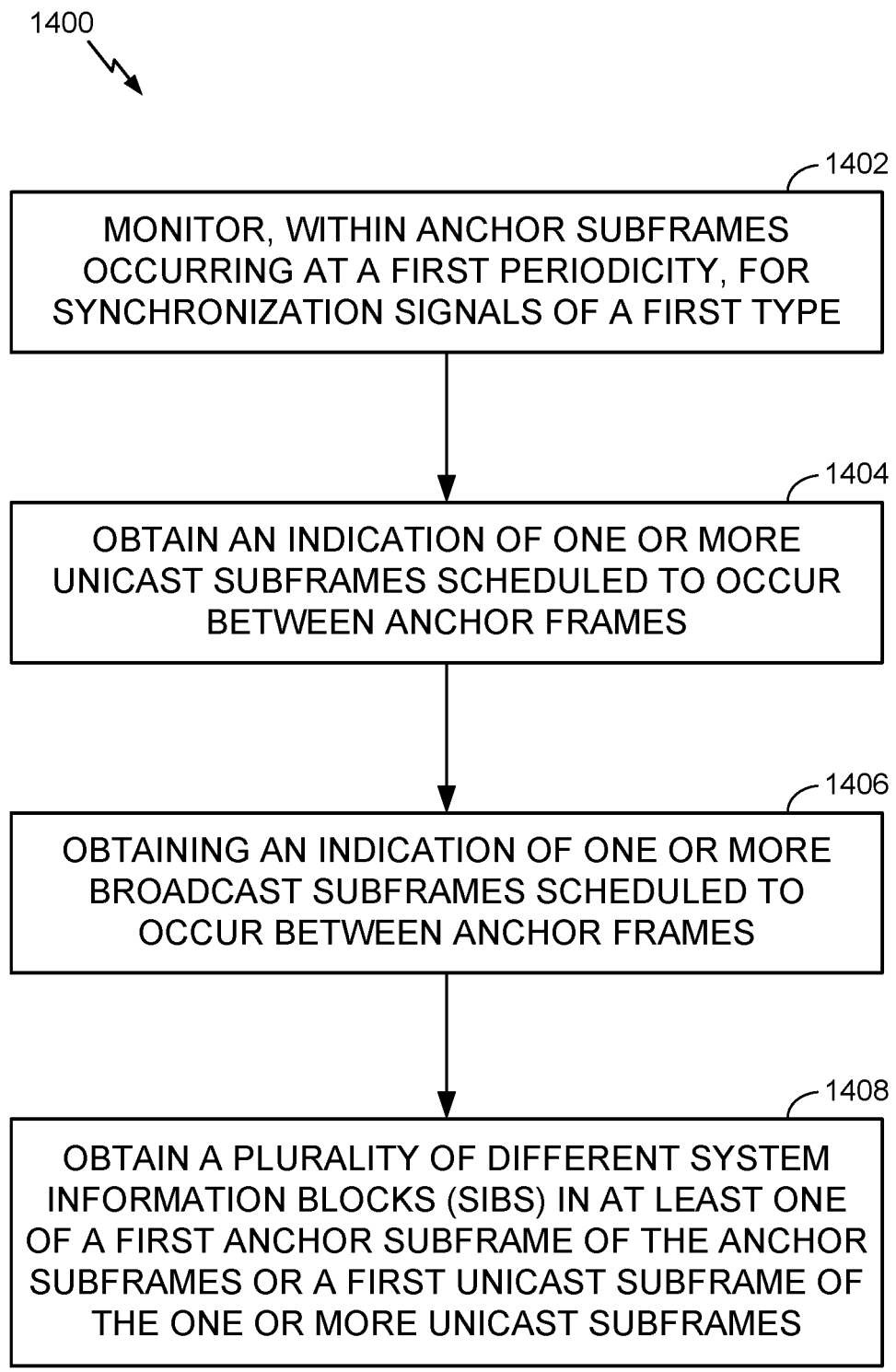
FIG. 14 is a flow diagram illustrating example operations for wireless communications by a user equipment (UE), in accordance with certain aspects of the present disclosure.

FIG. 14 illustrates example operations 1400 for wireless communications, which may be performed, for example, by a user equipment (e.g., UE 120), in accordance with aspects of the present disclosure. The UE may include one or more components as illustrated in FIGS. 2 and 5 which may be configured to perform the operations described herein. For example, the antenna 252, demodulator/modulator 254, controller/processor 280, and/or memory 282 as illustrated in FIG. 2 may perform the operations described herein. Additionally or alternatively, one or more of the processor 504, memory 506, transceiver 514, and/or antenna(s) 516 as illustrated in FIG. 5 may be configured to perform the operations described herein.

Operations 1400 begin at 1402 by monitoring, within anchor subframes occurring at a first periodicity, for synchronization signals of a first type. At 1404, the UE obtains an indication of one or more unicast subframes scheduled to occur between anchor subframes. At 1406, the UE obtains an indication of one or more broadcast subframes scheduled to occur between anchor subframes. At 1408, the UE obtains a plurality of system information blocks (SIBs) in at least one of a first anchor subframe of the anchor subframes or a first unicast subframe of the one or more unicast subframes. While not shown, operations 1400 may also include monitoring for synchronization signals within one or more broadcast subframes and monitoring for at least one of unicast data or broadcast data in one or more respective unicast subframes or broadcast subframes.

As noted above, multiple SIBs may be transmitted/received within a same subframe, which may be accomplished, for example by configuring the UE to monitor for different grants corresponding to different SIBs in the same subframe.

According to certain aspects, to differentiate between different SIBs, the base station may generate (and transmit) each SIB with a different SI-RNTI. The base station may then transmit multiple downlink grants, including the SI-RNTIs for each different SIB that will be transmitted. The UE may then monitor for the downlink grants with the different SI-RNTIs for the different SIBs. Based on the downlink grants, the UE may monitor for (and receive in a same subframe) the SIBs corresponding to the SI-RNTIs identified in the downlink grants. Additionally, since each received SIB is identified by a unique SI-RNTI, the UE may determine the type of SIBs (e.g., SIB1, SIB2, etc.) received based on the unique SI-RNTIs, for example, when multiple SIBs are received in the same subframe.

In some cases, the SI-RNTI for SIB1 may be fixed in specification or may depend on a physical cell identifier (PCID). According to certain aspects, when SIB1 schedules other SIBs, it may also signal the corresponding SI-RNTI for the other SIBs. For example, assuming SIB1 and SIB2 are transmitted by a base station in the same subframe, SIB1 and SIB2 may use different SI-RNTI, where SIB1's SI-RNTI may be fixed (e.g., in a standard) or based on the PCID and SIB2's SI-RNTI may be signaled in SIB1. According to certain aspects, if SIBs are time division multiplexed (TDM), the same SI-RNTI may be used for SIBs in different subframes. For example, assuming that SIB19 is TDM with the SIBs that come before it, SIB19 may reuse, for example, the SIB1 SI-RNTI since there would be no confusion at the UE. For example, since SI-RNTI may be mapped to a specific subframe the UE may determine the actual SIB transmitted. In other words, knowledge of subframe time may allow a UE to possibly use same SI-RNTI without any confusion in determining which SIB was sent. Additionally, according to certain aspects, instead of semi-static signaling of SI-RNTI (e.g., in SIB1), a standards document may contain fixed SI-RNTIs for SIBs after SIB1.

According to certain aspects, another way to differentiate SIBs transmitted in the same subframe may be for the base station to provide an indication in a field in downlink control information (DCI) (e.g., of a grant) of which SIBs are being transmitted in the subframe. According to certain aspects, this field can be a new field or use some reserved bits in the grant. Additionally, according to certain aspects, the SIB1 value for the field can be defined in a specification document (or depend on PCID). The field value for other SIBs may be fixed in specification document or signaled in SIB1. According to certain aspects, if SIBs are time division multiplexed (TDM), the same SI-RNTI may be used for SIBs in different subframes. For example, assuming that SIB19 is TDM with the SIBs that come before it, SIB19 may reuse, for example, the SIB1 SI-RNTI since there would be no confusion at the UE as noted above. Additionally, according to certain aspects, instead of semi-static signaling of SI-RNTI (e.g., in SIB1), a standards document may contain fixed SI-RNTIs for SIBs after SIB1.

According to certain aspects, even when the base station is transmitting multiple SIBs simultaneously, the UE may not be required to monitor for each SIB simultaneously, for example, since not all SIBs are required to be processed at the same rate.

According to certain aspects, additional information may be carried in a synchronization channel (e.g., carrying the synchronization signals described above) or physical broadcast channel (PBCH) indicating SIB (especially SIB1) scheduling. For example, the PBCH or synchronization channel may include some bits indicating that the base station is standalone MBMS or secondary cell (Scell) MBMS. In such a case, the SIB1 periodicity and subframe allocation may be changed from subframe 5 to subframe 0 every 40 ms.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for transmitting, means for retransmitting, means for sending, and/or means for providing may comprise a transmitter, which may include the transmit processor 220, the TX MIMO processor 230, the modulator(s) 232a-232t, and/or antenna(s) 234a-234t of the base station 110 illustrated in FIG. 2; the transmit processor 264, the TX MIMO processor 266, the modulator(s) 254a-254r, and/or antenna(s) 252a-252r of the user equipment 120 illustrated in FIG. 2; and/or the transmitter 510, DSP 520, and/or antenna(s) 516 of the wireless device 502 illustrated in FIG. 5.

Means for receiving and/or means for obtaining may comprise a receiver, which may include the receive processor 238, the MIMO detector 236, the demodulator(s) 232a-232t, and/or antenna(s) 234a-234t of the base station 110 illustrated in FIG. 2; the receive processor 258, the MIMO detector 256, the demodulator(s) 254a-254r, and/or antenna(s) 252a-252r of the user equipment 120 illustrated in FIG. 2; and/or the receiver 512, DSP 520, signal detector 518, and/or antenna(s) 516 of the wireless device 502 illustrated in FIG. 5.

Means for determining, means for performing, means for monitoring, and/or means for changing may comprise a processing system, which may include controller/processor 240 and/or the other processors of the base station 110 illustrated in FIG. 2; the controller/processor 280 and/or other processors of the user equipment 120 illustrates in FIG. 2; and/or the processor 504 of the wireless device 502 illustrated in FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
   transmitting, within anchor subframes occurring at a first periodicity, synchronization signals of a first type;
   providing an indication of one or more unicast subframes scheduled to occur between anchor subframes;
   providing an indication of one or more broadcast subframes scheduled to occur between anchor subframes; and
   transmitting a plurality of different system information blocks (SIBs) in at least one of a first anchor subframe of the anchor subframes or a first unicast subframe of the one or more unicast subframes;
   wherein each SIB in the plurality of different SIBs is associated with a different identifier.

2. The method of claim 1, wherein at least one of the different identifiers is dependent on a cell identifier.

3. The method of claim 1, wherein at least one identifier associated with one SIB of the plurality of different SIBs is signaled in another SIB of the plurality of different SIBs.

4. The method of claim 1, wherein at least one of the identifiers used for a first type of SIB is reused from a previous subframe in which the same identifier is used for a second type of SIB.

5. The method of claim 1, further comprising providing an indication, via downlink control information (DCI), of a type of SIB being transmitted.

6. A method for wireless communications by a user equipment (UE), comprising:
   monitoring, within anchor subframes occurring at a first periodicity, for synchronization signals of a first type;
   obtaining an indication of one or more unicast subframes scheduled to occur between anchor subframes;
   obtaining an indication of one or more broadcast subframes scheduled to occur between anchor subframes; and
   obtaining a plurality of different system information blocks (SIBs) in at least one of a first anchor subframe of the anchor subframes or a first unicast subframe of the one or more unicast subframes;
   wherein each SIB of the plurality of different SIBs is associated with a different identifier.

7. The method of claim 6, wherein at least one of the different identifiers is dependent on a cell identifier.

8. The method of claim 6, wherein at least one identifier associated with one SIB of the plurality of different SIBs is signaled in another SIB of the plurality of different SIBs.

9. The method of claim 6, wherein at least one of the identifiers is specified in a standard.

10. The method of claim 6, wherein at least one of the identifiers used for a first type of SIB is reused from a previous subframe in which the same identifier is used for a second type of SIB.

11. The method of claim 6, further comprising determining a type of a first SIB of the plurality of different SIBs based, at least in part, on the identifier associated with the first SIB.

12. The method of claim 6, further comprising receiving an indication, via downlink control information (DCI), of a type of SIB being transmitted.

13. An apparatus for wireless communications by a base station (BS), comprising: at least one processor configured to:
   transmit, within anchor subframes occurring at a first periodicity, synchronization signals of a first type;

provide an indication of one or more unicast subframes scheduled to occur between anchor subframes;
provide an indication of one or more broadcast subframes scheduled to occur between anchor subframes; and
transmit a plurality of different system information blocks (SIBs) in at least one of a first anchor subframe of the anchor subframes or a first unicast subframe of the one or more unicast subframes; and
a memory coupled with the at least one processor;
wherein each SIB in the plurality of different SIBs is associated with a different identifier.

14. The apparatus of claim 13, wherein at least one of the different identifiers is dependent on a cell identifier.

15. The apparatus of claim 13, wherein at least one identifier associated with one SIB of the plurality of different SIBs is signaled in another SIB of the plurality of different SIBs.

16. The apparatus of claim 13, wherein at least one of the identifiers used for a first type of SIB is reused from a previous subframe in which the same identifier is used for a second type of SIB.

17. The apparatus of claim 13, wherein the at least one processor is further configured to provide an indication, via downlink control information (DCI), of a type of SIB being transmitted.

18. An apparatus for wireless communications by a user equipment (UE), comprising: at least one processor configured to:
monitor, within anchor subframes occurring at a first periodicity, for synchronization signals of a first type;
obtain an indication of one or more unicast subframes scheduled to occur between anchor subframes;
obtain an indication of one or more broadcast subframes scheduled to occur between anchor subframes; and
obtain a plurality of different system information blocks (SIBs) in at least one of a first anchor subframe of the anchor subframes or a first unicast subframe of the one or more unicast subframes; and
a memory coupled with the at least one processor;
wherein each SIB of the plurality of different SIBs is associated with a different identifier.

19. The apparatus of claim 18, wherein at least one of the different identifiers is dependent on a cell identifier.

20. The apparatus of claim 18, wherein at least one identifier associated with one SIB of the plurality of different SIBs is signaled in another SIB of the plurality of different SIBs.

21. The apparatus of claim 18, wherein at least one of the identifiers is specified in a standard.

22. The apparatus of claim 18, wherein at least one of the identifiers used for a first type of SIB is reused from a previous subframe in which the same identifier is used for a second type of SIB.

23. The apparatus of claim 18, wherein the at the at least one processor is further configured to determine a type of a first SIB of the plurality of different SIBs based, at least in part, on the identifier associated with the first SIB.

24. The apparatus of claim 18, further comprising receiving an indication, via downlink control information (DCI), of a type of SIB being transmitted.

* * * * *